(12) United States Patent
Fujita et al.

(10) Patent No.: US 6,388,976 B1
(45) Date of Patent: May 14, 2002

(54) COMPACT OPTICAL HEAD INCLUDING TWO LIGHT EMITTERS HAVING PARALLEL OPTICAL AXES

(75) Inventors: Shinji Fujita, Yokohama; Hidenori Shinohara, Hitachinaka; Toshio Sugiyama, Yokohama; Nobuo Imada, Fujisawa; Yukio Fukui, Machida, all of (JP)

(73) Assignees: Hitachi, Ltd.; Hitachi Media Electronics Co., Ltd., both of Tokyo (JP)

( * ) Notice: Subject to any disclaimer, the term of this patent is extended or adjusted under 35 U.S.C. 154(b) by 0 days.

(21) Appl. No.: 09/515,595

(22) Filed: Feb. 29, 2000

Related U.S. Application Data

(63) Continuation of application No. 08/991,100, filed on Dec. 12, 1997, now Pat. No. 6,069,862.

(30) Foreign Application Priority Data

Dec. 13, 1996 (JP) .............................................. 8-333999

(51) Int. Cl.[7] ................................................. G11B 7/00
(52) U.S. Cl. .............................. 369/112.01; 369/112.23; 369/112.28; 369/112.29; 369/53.2
(58) Field of Search ........................... 369/103, 112.01, 369/112.28, 112.23, 112.29, 120, 121, 112.25, 53.2, 53.22, 110.01, 110.02

(56) References Cited

U.S. PATENT DOCUMENTS

| 5,513,164 | A | * | 4/1996 | Tanaka et al. |
| 5,777,970 | A | * | 7/1998 | Kajiyama et al. |
| 5,912,868 | A | * | 6/1999 | Hayashi et al. |

\* cited by examiner

*Primary Examiner*—Paul W. Huber
(74) *Attorney, Agent, or Firm*—Mattingly, Stanger & Malur, P.C.

(57) ABSTRACT

A dichroic mirror of a polarized beam splitter is installed between a mirror and an objective lens as a beam synthesize/split means, in an optical system corresponding to a second dick and an optical system corresponding to a first disk arranged so as to form a two-layer structure. The dimension of the optical head in the width, length, and thickness directions are designed moderately.

23 Claims, 13 Drawing Sheets y (LENGTH DIRECTION)
x (WIDTH DIRECTION)
z z (THICKNESS DIRECTION)
x (WIDTH DIRECTION)
y y (LENGTH DIRECTION)
x (WIDTH DIRECTION)
z z (THICKNESS DIRECTION)
x (WIDTH DIRECTION)
y y (LENGTH DIRECTION)
x (WIDTH DIRECTION)

z (THICKNESS DIRECTION)
x (WIDTH DIRECTION)

y (LENGTH DIRECTION)
x (WIDTH DIRECTION)
z z (THICKNESS DIRECTION)
x (WIDTH DIRECTION)
y

COMPACT OPTICAL HEAD INCLUDING TWO LIGHT EMITTERS HAVING PARALLEL OPTICAL AXES

This application is a continuation of U.S. patent application Ser. No. 08/991,100, filed Dec. 12, 1997, now U.S. Pat. No. 6,069,862.

BACKGROUND OF THE INVENTION

The present invention relates to a single optical disk unit for recording and/or reproducing data on or from two or more kinds of optical disks with different corresponding wave lengths.

An optical disk unit is an information recording and reproducing apparatus having characteristics as a medium such as noncontact, large capacity, random access, and low cost and is widely used as a recording and reproducing apparatus of a digital audio signal or an external storage for a computer using these characteristics.

As a large capacity of computer data and recording and reproducing of digital moving picture information have been put to practical use recently, a highly densed storage capacity of an optical disk unit is required. It may be cited as one of the means for realizing high density to make an optical spot focusing on the recording surface of an optical disk smaller and improve the resolution. The size of the optical spot is decided by the wave length of a laser beam source to be used and the numerical aperture NA of an objective lens, and when the wave length to be used is shortened, the diameter of the optical spot can be made smaller. In a DVD (digital video disk, ROM) standardized as a high density optical disk, it is decided to set the wave length to be used to 635 nm or 650 nm. In this case, the numerical aperture NA is $n \sin \theta$, where n indicates a refraction factor on the emission side.

However, when an optical disk recorded in correspondence with the conventional wave length, 780 nm is reproduced using a laser beam with a short wave length of 635 nm or 650 nm, there is a problem imposed that a playback signal and control signal lowers due to differences in the reflection factor and absorption factor of the information recording surface. For example, in the standard of CD-R which is a write enable CD, the reflection factor is specified as 65% or more at a wave length between 775 and 820 nm. However, the reflection factor at a wave length beyond the specified range is low and may be, for example, about 5% in the neighborhood of 635 nm. On the other hand, the reproduction power is specified as 0.7 mW or less, so that it is difficult to obtain a sufficient playback signal and control signal when a laser beam with a short wave length is used.

According to the prior art described in Japanese Patent Application Laid-Open 8-55363, an optical system using a short wave length laser beam corresponding to a high density optical disk (hereinafter abbreviated to high density disk optical system) and a conventional optical system using a long wave length laser beam corresponding to a conventional CD or CD-R (hereinafter abbreviated to CD optical system) are loaded on an optical head, and an optical disk with a different corresponding wave length can be reproduced by switching the optical system depending on the disk to be reproduced. Furthermore, a common portion is provided in the high density disk optical system and the CD optical system using a beam synthesize/split means such as a polarized beam splitter, and the optical head is miniaturized.

In the aforementioned prior art, there are a constitution that the light flux synthesized by a beam synthesize/split means 23 is led to a beam convergent means 21 using a beam reflect means 22 such as a mirror as shown in FIG. 10a, and a constitution that there is no beam reflect means and the light flux synthesized by the beam synthesize/split means 23 is directly led to the beam convergent means 21 as shown in FIG. 10b.

In the constitution shown in FIG. 10a, the non-common portions of the high density disk optical system and the CD optical system are arranged in the same plane parallel with the disk surface, so that the optical head is increased in the length direction and width direction. In the constitution shown in FIG. 10b, one of the high density disk optical system and the CD optical system is arranged in the plane including the optical axis of the objective lens, so that the optical head is increased in the thickness direction. As mentioned above, it may be difficult to load the optical head by the prior art in an optical disk unit in which the size is limited in the length, width, and thickness directions, such as one to be built in a personal computer or an audio system mounted on a car.

SUMMARY OF THE INVENTION

An object of the present invention is to solve the above problem and to provide an optical head which has few restrictions in the dimensions in the length direction, width direction, and thickness direction caused by the size of an optical disk unit and which is moderately small and to miniaturize the optical disk unit at the same time.

To solve the above problem, the optical head of the present invention comprises a first light emission means for generating light having, a predetermined wave length, a second light emission means for generating light having a different wave length from that of the first light emission means, a beam convergent means for converging a first light flux outputted from the first light emission means on the information recording surface of a first disk and converging a second light flux outputted from the second light emission means on the information recording surface of a second disk which is different from the first disk in the corresponding wave length, a beam reflect means for changing the beam direction of the first light flux which is arranged between the first light emission means and the beam convergent means, and a beam synthesize means for synthesizing the first light flux and the second light flux arranged between the beam reflect means and the beam convergent means. Therefore, the high density disk optical system and the CD optical system are arranged so as to form a two-layer structure along the direction of the optical axis of the objective lens.

By use of such a constitution, each optical system is arranged in the serial direction along the direction of the optical axis of the objective lens, and the dimensions of the optical head in the length direction, width direction, and thickness direction can be selected moderately. Thus, a small optical head which is hardly restricted by the size of the optical disk unit can be provided. Furthermore, the optical disk unit can be miniaturized.

DETAILED EXPLANATION OF THE PREFERRED EMBODIMENTS

The constitution, operation, and effects of an optical head showing the first embodiment of the present invention will be explained hereunder with reference to the accompanying drawings.

Figure 1A:
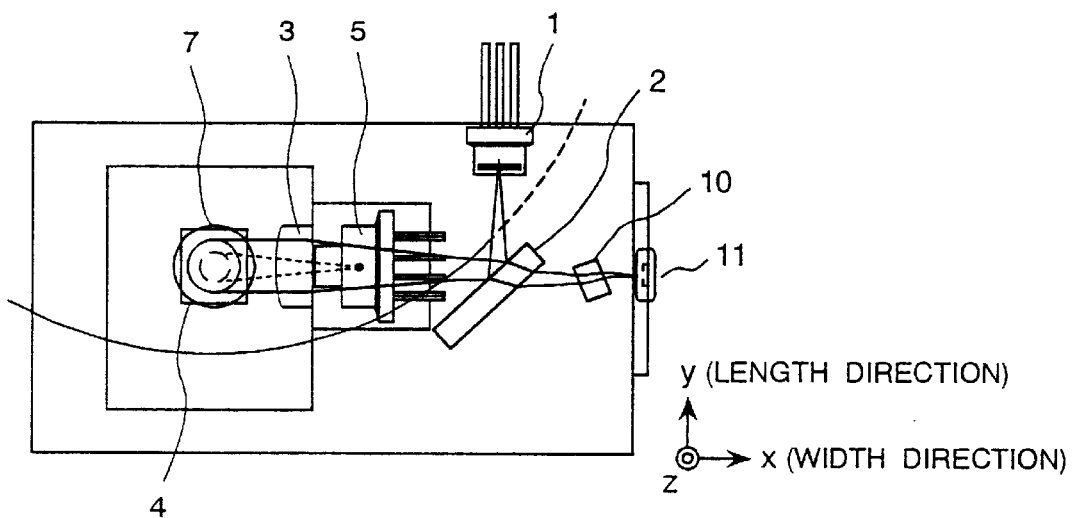
FIGS. 1a and 1b are schematic views of an optical head showing the first embodiment of the present invention.
Figure 1B:
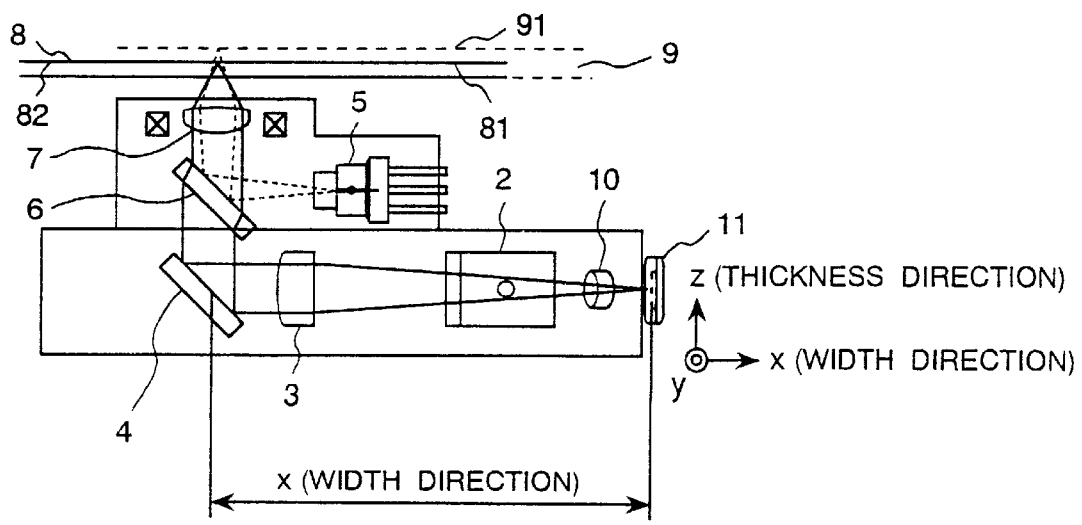

FIGS. 1a and 1b are schematic views of an optical head showing an embodiment of the present invention. A light source 1 is, for example, a semiconductor laser diode and the light output thereof has a short wave length corresponding to a high density disk 8 such as a DVD, for example, 650 nm. A half mirror 2 leads light reflected from an information recording surface 81 of the high density disk 8 to the detection lens system 10. A collimator lens 3 converts the divergent light outputted from the light source 1 to a parallel light flux. A mirror 4 converts a light flux traveling in the direction perpendicular to the optical axis of an objective lens 7 so as to travel in the direction of the optical axis of the objective lens 7. A semiconductor laser module 5 comprises a light source having a different wave length from that of the light source 1 and a photo detector which are integrated. The wave length of light output by the semiconductor laser module 5 has a wave length corresponding to a normal disk 9 and longer than that of the light source 1 corresponding to the high density disk 8, for example, 780 nm. The optical distance from the light emission point to the objective lens 7 is set so that the divergent angle of a light flux entering the objective lens 7 becomes appropriate.

Figure 2:
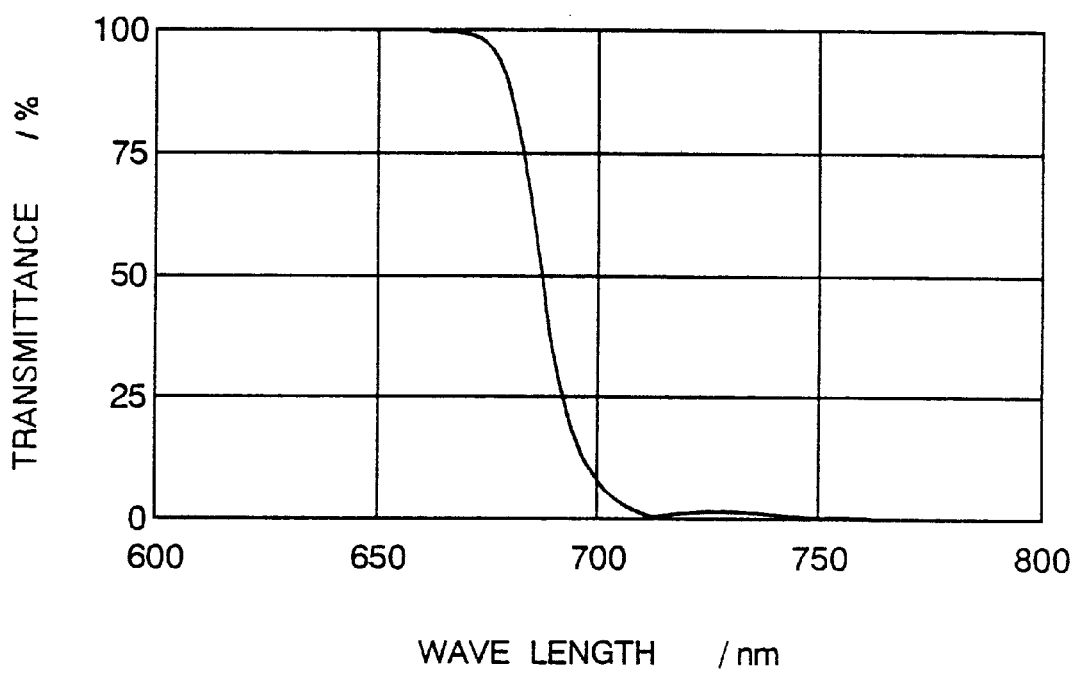
FIG. 2 is a drawing showing an example of transmittance—wave length dependence of a dichroic mirror.

A dichroic mirror 6 in the shape of a parallel flat plate is, for example, an optical element having a high transmittance and reflection factor—wave length dependence as shown in FIG. 2 and, in this case, a dichroic mirror having a high reflection factor at a wave length of 780 nm and a high transmittance at a wave length of 650 nm is used. The dichroic mirror 6 synthesizes (makes the optical axes coincide with each other) light entering from the mirror 4 and light flux entering from the laser module 5 and leads them to the objective lens 7.

Reflected light fluxes from the information recording surfaces of the disks 8 and 9 enter the dichroic mirror 6 via the objective lens 7. The dichroic mirror 6 reflects and leads the light flux with a long wave length from the disk 9 to the laser module 5 and passes and leads the light flux with a short wave length from the disk 8 to the mirror 4.

The objective lens 7 is designed to focus a parallel light flux with a wave length of 650 nm of the light source 1 with satisfactory aberration via a disk board with a thickness of 0.6 mm. A transparent protective film 82 is formed on the surface of the disk board and light transmits the protective film 82 and is reflected on the information recording surface 81. In normal use, when a light flux with a wave length of 780 nm of the laser module 5 passes a disk board with a thickness of 1.2 mm using the objective lens 7, spherical aberration increases. Therefore, the light flux cannot be focused on an information recording surface 91 of the normal disk 9 with satisfactory aberration.

However, depending on the divergent angle of a light flux entering the objective lens 7, it is possible to cancel the spherical aberration caused by differences in the disk thickness and wave length and obtain a satisfactory spot. The aforementioned laser module 5 is arranged in a position where the divergent angle of a light flux entering the objective lens 7 is given so as to form a satisfactory spot on the information recording surface 91 of the normal disk 9 with a corresponding wave length of 780 nm at a thickness of 1.2 mm using the objective lens 7.

The high density disk 8 is 0.6 mm in thickness and the corresponding wave length is a 650-nm band. The normal disk 9 is 1.2 mm in thickness and the corresponding wave length is longer that of the high density disk 8 such as a 780-nm band. A detector optics 10 is provided so as to detect light reflected from the high density disk 8.

When the astigmatism method is used for focus control, the detector optics 10 comprises a cylinder lens and others. A photo detector 11 using a photodiode detects a reproduced signal as well as a control signal for controlling the focusing position.

The aforementioned embodiment uses the light source 1, the half mirror 2, the detection lens system 10, and the photo detector 11. However, these may have the same constitution as that of the semiconductor module 5. In this case, the optical axis of the high density optical system (corresponding to high density disk 8) is parallel with the optical axis of the CD optical system (corresponding to high density disk 9). The operation of an optical head having the aforementioned constitution when data is recorded or reproduced on or from the high density disk 8 will be explained hereunder.

The light source 1 is turned on and the laser module 5 is turned off. Almost 50% of a light flux outputted from the light source 1 is reflected from the half mirror 2, changes its beam direction, enters the collimator lens 3, and is converted to a parallel light flux. The parallel light flux reflects from the mirror 4 and goes toward the dichroic mirror 6. The dichroic mirror 6 has a high transmittance for a light flux with a wave length of 650 nm, so that the incident light flux transmits as it is, enters the objective lens 7, and focuses on the information recording surface 81 of the high density disk 8 with satisfactory aberration.

The light flux reflected from the information recording surface 81 of the high density disk 8 transmits the objective lens 7 and the dichroic mirror 6 and then reflects from the mirror 4 and enters the collimator lens 3. The light flux is converted to a converged light flux by the collimator lens 3 and enters the half mirror 2 and almost 50% thereof transmits it and is led to the detector optics 10 and then reaches the photo detector 11, and a reproduced signal and a control signal are detected.

The operation when the normal disk 9 is recorded or reproduced will be explained hereunder.

The light source 1 is turned off and the laser module 5 is turned on. A light flux outputted from the laser module 5 goes toward the dichroic mirror 6. The dichroic mirror 6 has a high reflection factor for a light with a wave length of 780 nm, so that the light flux reflects, changes its direction, and enters the objective lens 7.

The light flux enters the objective lens 7 as divergent light, and the divergent angle at this time is an angle for canceling the spherical aberration caused by differences in the wave length and disk thickness, so that the light flux is focused on the information recording surface 91 of the normal disk 9 with satisfactory aberration.

The light flux reflected from the normal disk 9 transmits the objective lens 7, is reflected from the dichroic mirror 6, and enters the laser module 5, and a reproduced signal and a control signal are detected.

A difference in the numerical aperture between when light is focused on the high density disk 8 and when light is focused on the normal disk 9, that is, a difference in the diameter of the incident light flux into the objective lens 7 is not explained. However, this problem can be solved by installing corresponding irises in the non-common portions of the high density disk optical system and the normal disk (CD) optical system respectively. Aperture restrictions using a wave length selection filter having a transmittance and reflection factor—wave length dependence which is the same as that of the dichroic mirror 6 may be provided between the objective lens 7 and the dichroic mirror 6.

As mentioned above, according to the first embodiment of the present invention, two or more kinds of disks with different corresponding wave lengths can be recorded or reproduced as before.

Next, effects of the first embodiment of the present invention will be explained by comparing with the constitution of a conventional optical head. The coordinate system is as shown in each drawing.

Figure 3A:
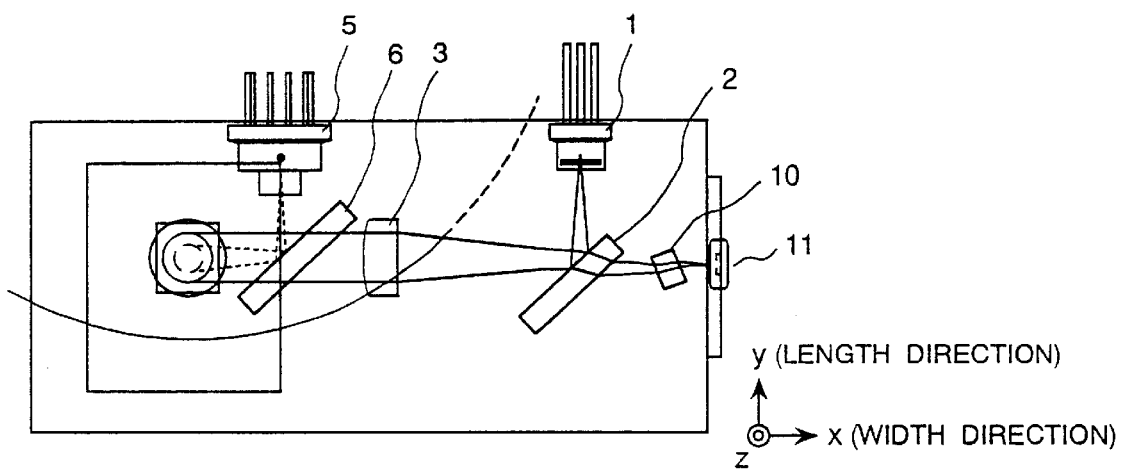
FIGS. 3a and 3b are schematic views of a conventional optical head.
Figure 3B:
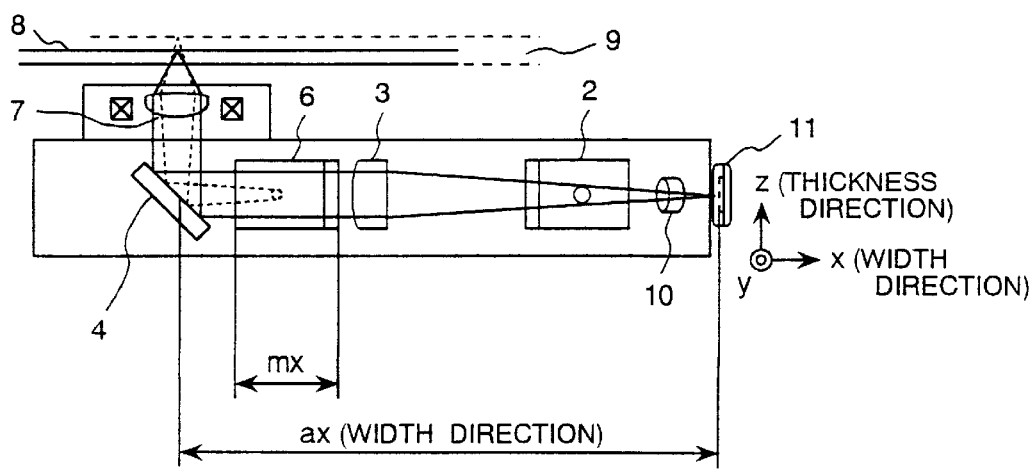
Figure 4A:
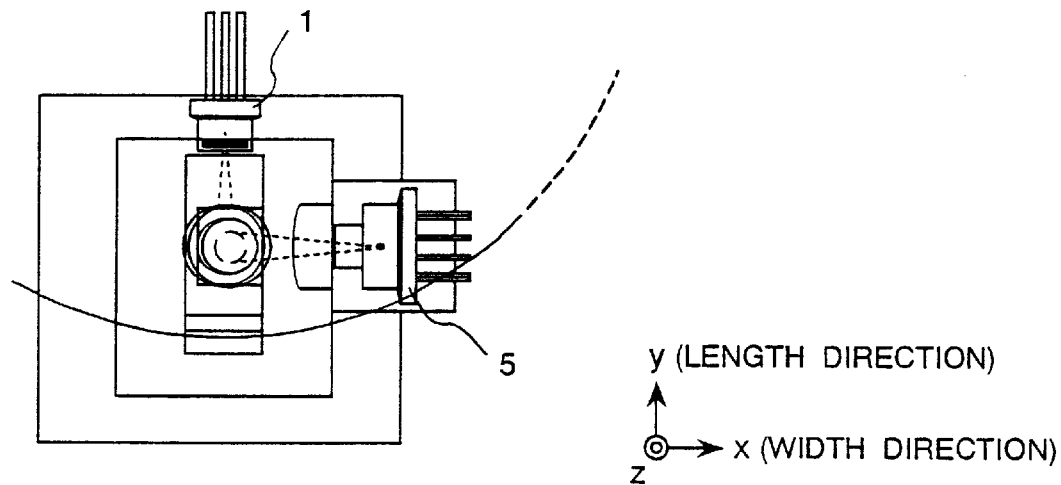
FIGS. 4a and 4b are schematic views of a conventional optical head.
Figure 4B:
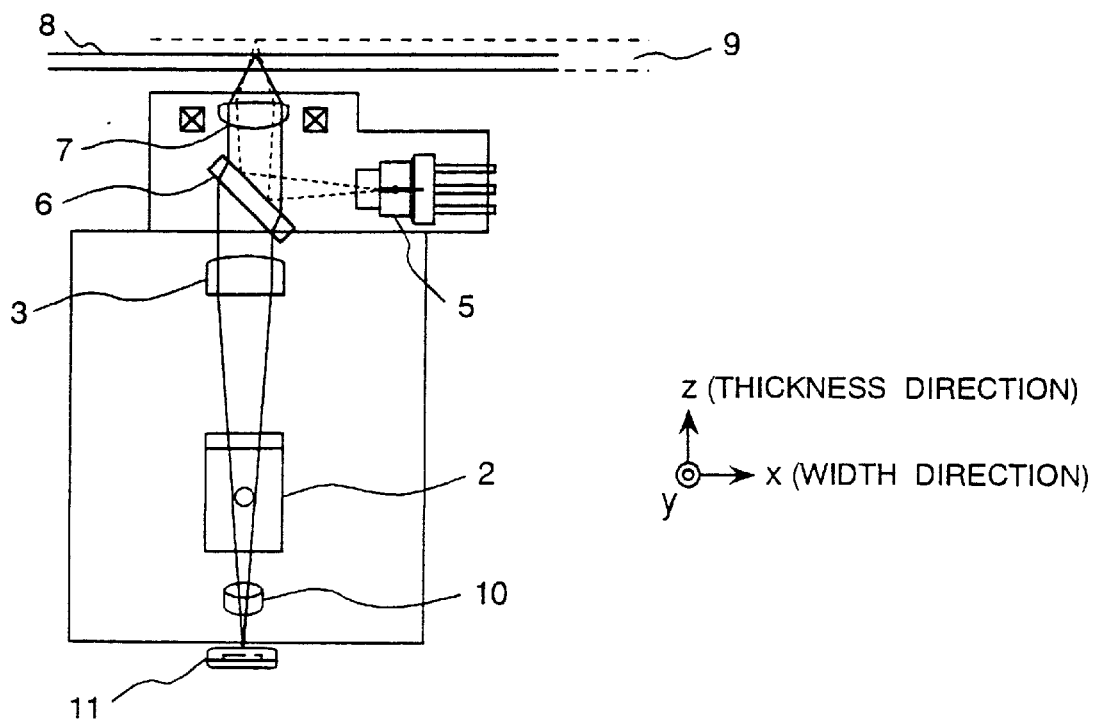
Figure 10A:
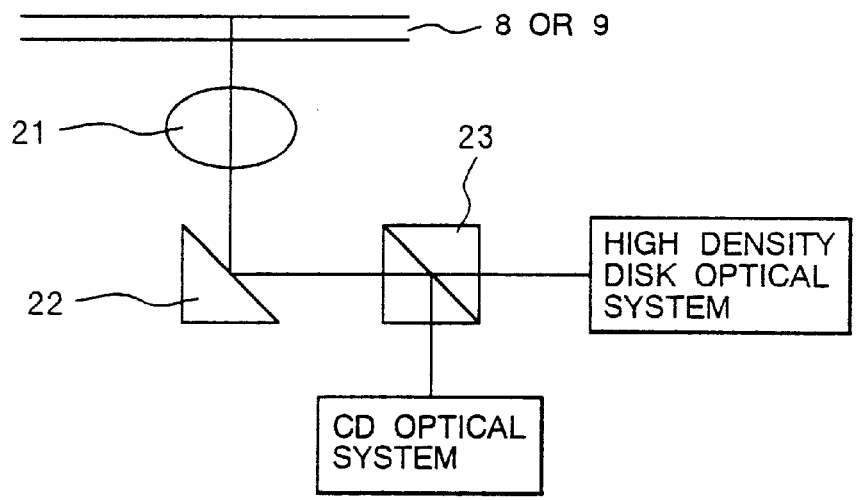
FIG. 10 is a schematic view for explaining the optical system of a conventional optical head.
Figure 10B:
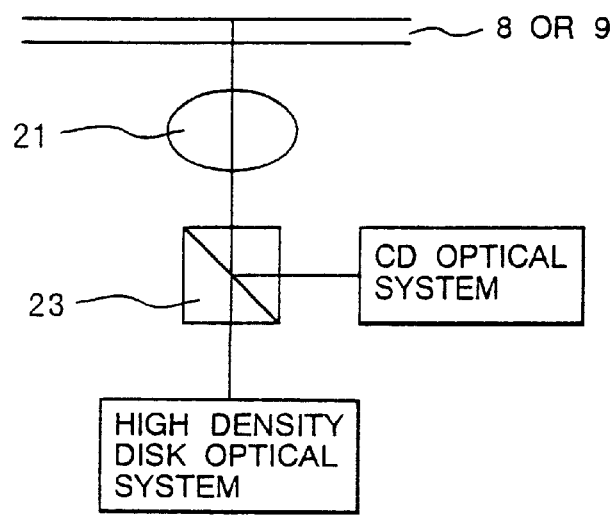

FIGS. 3a and 3b are detailed drawings of an optical head having the mirror 4 arranged between a beam synthesize/split means (the dichroic mirror 6 in the drawing) and a beam convergent means (the objective lens 7 in the drawing) as shown in FIG. 10a as prior art. FIGS. 4a and 4b are detailed drawings of an optical head having no beam reflect means (the mirror 4 in the previous drawing) which is structured so as to lead a light flux synthesized by a beam synthesize/split means (the dichroic mirror 6 in the drawing) directly to a beam 5 convergent means (the objective lens 7 in the drawing) as shown in FIG. 10b as prior art, and the high density disk system is arranged in a plane perpendicular to the information recording surface 81 or 91 of the disk 8 or 9. Namely, the optical axes of the collimator lens 3, the half mirror 2, the detector optics 10, and the photo detector 11 are in the same direction as that of the optical axis of the object lens 7.

The distance of the photo detector 11 in the x direction from the mirror 4 of the optical head shown in FIGS. 3a and 3b is assumed as ax and the length of the dichroic mirror 6 in the x direction is assumed as mx. Assuming the distance between the photo detector 11 and the mirror 4 of the optical head in the first embodiment of the present invention shown in FIGS. 1a and 1b as x, ax≧x+mx, that is, x<ax is held. According to the present invention, an optical head which is smaller than a conventional one in the x direction (width direction) can be provided and can be mounted in an optical disk unit having a dimensional restriction in the x direction.

In the case of the optical head shown in FIGS. 3a and 3b the distance between the objective lens 7 and the laser module 5 cannot be reduced to a certain distance or less due to the mirror 4 existing in the optical path, and it may be impossible to arrange the laser module 5 in a desired position. However, the optical head in the embodiment shown in FIG. 1a and 1b is free of worries about it.

On the other hand, the length of the optical head in the x direction (width direction) shown in FIGS. 4a, 4b is smaller than the length of the optical head in the x direction shown in FIG. 1. However, due to the constitution that the high density disk optical system is arranged in a plane perpendicular to the disk 8 or 9, that is, since the optical axis of the high density disk system is in the same direction as that of the optical axis of the objective lens 7, the optical head increases in size in the z direction (thickness direction). An ordinary optical disk unit is strictly restricted in the thickness direction rather than the width direction and length direction (Y direction) so as to miniaturize the unit, so that the optical head shown in FIGS. 1a–1b is not realistic.

As mentioned above, according to one embodiment of the present invention, when the beam synthesize/split means 6 is installed between the mirror 4 of the high density disk optical system and the objective lens 7, the dimensions of an optical head in the thickness, width, and length directions which records or reproduces two or more kinds of disks with different corresponding wave lengths are made moderate, and the optical head can be mounted in an optical disk unit to be built in a personal computer or an audio system mounted on the car, the size of which optical disk unit is restricted. Furthermore, when the CD optical system is set as a finite system and a laser module with light emission and reception integrated is used, the number of parts is reduced and a small and inexpensive optical head can be provided.

In this embodiment, the position of the laser module 5 is specified by the divergent angle entering the objective lens 7. However, the present invention is not limited to this example. When a means for converting the divergent and convergent angles of a light flux of a concave lens or others is installed between the laser module 5 and the dichroic mirror 6, and the divergent angle of an incident light flux into the objective lens 7 is controlled by the lens power, the position of the laser module 5 can be decided optionally.

When a light flux with a wave length of 780 nm enters the objective lens 7 for focusing a parallel light flux with a wave length of 650 nm with satisfactory aberration via a disk board with a thickness of 0.6 mm and focuses via a board with a thickness of 1.2 mm, a spherical aberration is generally generated and a satisfactory spot cannot be obtained. When an incident light flux is divergent light having a predetermined divergent angle, it is known that a satisfactory spot can be obtained also for a 1.2-mm disk. In the aforementioned embodiment, the laser module 5 is arranged in the position conforming to this condition.

When such an objective lens is shared, to limit a spot on the information recording surface 91 of the disk 9 even when a CD having a long wave length is used under the condition that the divergent angle is decided, it is necessary to arrange the light source at a fixed distance from the information recording surface 91. In the aforementioned embodiment, the light source 5 for a CD with a long wave length is arranged in the neighborhood of the objective lens 7, so that the position relation can be set easily.

Figure 13:
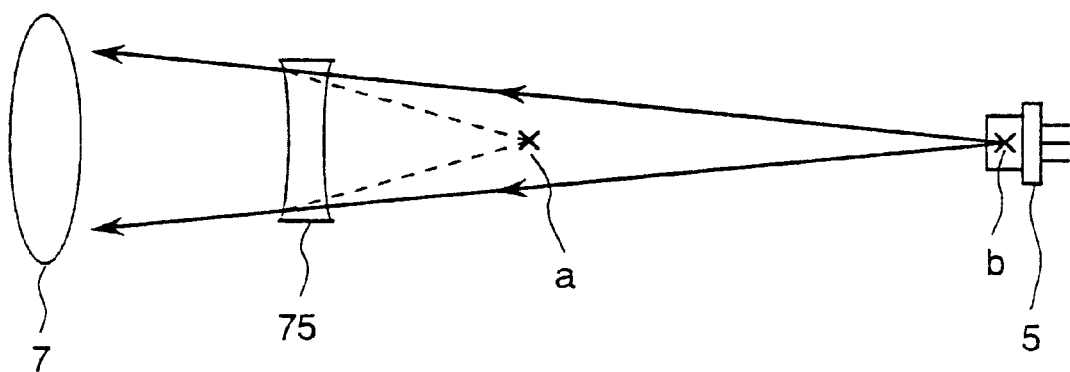
FIG. 13 is an illustration for a light flux conversion device.

When the divergent angle is decided as shown in FIG. 13, the arrangeable position of the laser module is decided at a point of a. The light flux conversion means changes the divergent angle of a light flux and for example, a concave lens 75 is arranged in front of the objective lens 7, and the position of the laser module can be changed to the point b with the divergent angle of a light flux entering the objective lens 7 kept at the predetermined angle. Furthermore, when the distance between the objective lens 7 and the laser module 5 is made longer using the concave lens 75, the aberration of a spot can be made better. Furthermore, for example, when the distance between the objective lens 7 and the laser module 5 is made shorter using a lens, the use factor can be improved.

In this embodiment, an objective lens designed so as to focus a parallel light flux with the wave length of the light source 1 on the information recording surface 81 of the high density disk 8 with satisfactory aberration is used as a beam convergent means. However, the present invention is not limited to this example.

The same effect can be obtained also by using an objective lens designed so as to focus the predetermined divergent light flux or convergent light flux with the wave length of the light source 1 on the information recording surface 81 of the disk 8 with satisfactory aberration when the high density disk optical system is set as a finite system.

Figure 11A:
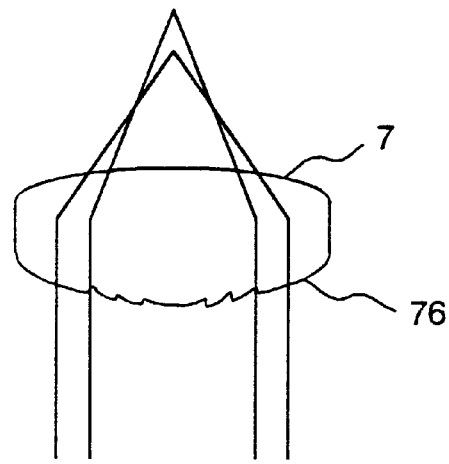
FIGS. 11a and 11b are drawings showing the constitution of an objective lens having a hologram.
Figure 11B:
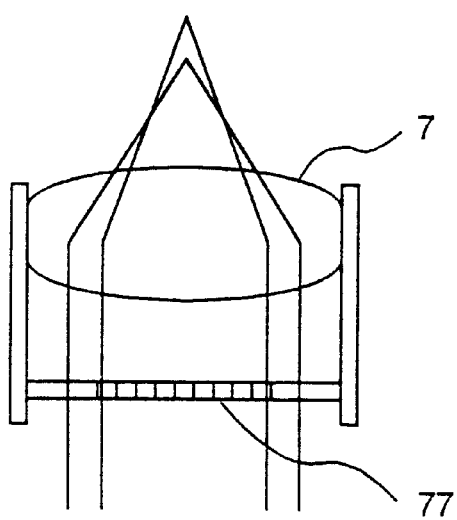

A hologram objective lens may be used as a beam convergent means. The hologram pattern is that the primary light is focused on the information recording surface 91 of the disk 9 with satisfactory aberration for the wave length of the laser module 5, and the zero-order light is focused on the information recording surface 81 of the high density disk 8 with satisfactory aberration for the wave length of the light source 1. With respect to hologram surfaces 76 and 77, even if the hologram surface 76 is directly engraved on the lens 7 as shown in FIG. 11a, the hologram surface 77 is mounted together with the objective lens 7 as a different part as shown in FIG. 11b and both the hologram surfaces may move together. In FIG. 11a, in which the hologram pattern is formed on the lens surface, the two focuses of the numerical aperture NA 0.6 of the DVD by the zero-order light and the numerical aperture 0.45 of the CD by the primary light are linked, so that both the DVD and CD can be reproduced by a single lens. Each numerical aperture is a specified value. On the other hand, in FIG. 11b in which the hologram surface 77 is a different part from the objective lens 7, the focus of the DVD by the zero-order light and the focus of the CD by the primary light are linked.

Figure 12A:
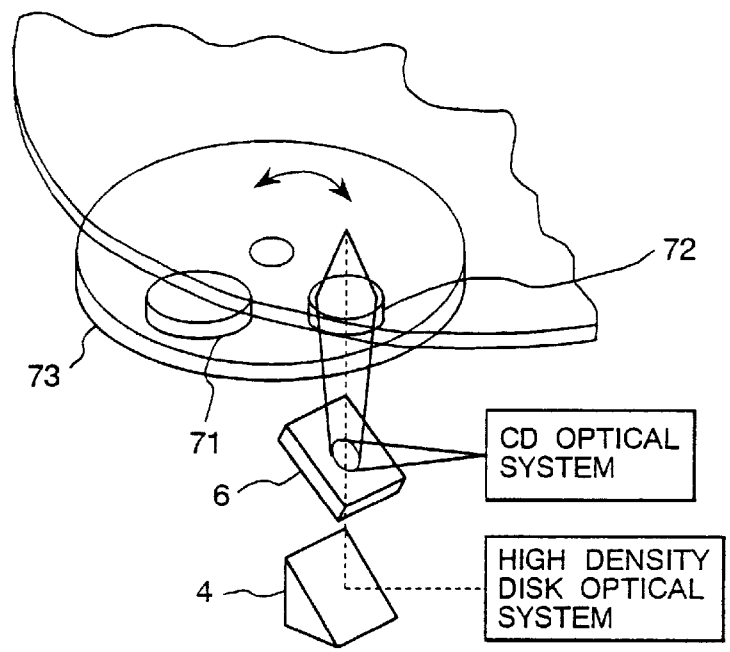
FIGS. 12a and 12b are schematic drawings showing an exchange device of an objective lens.
Figure 12B:
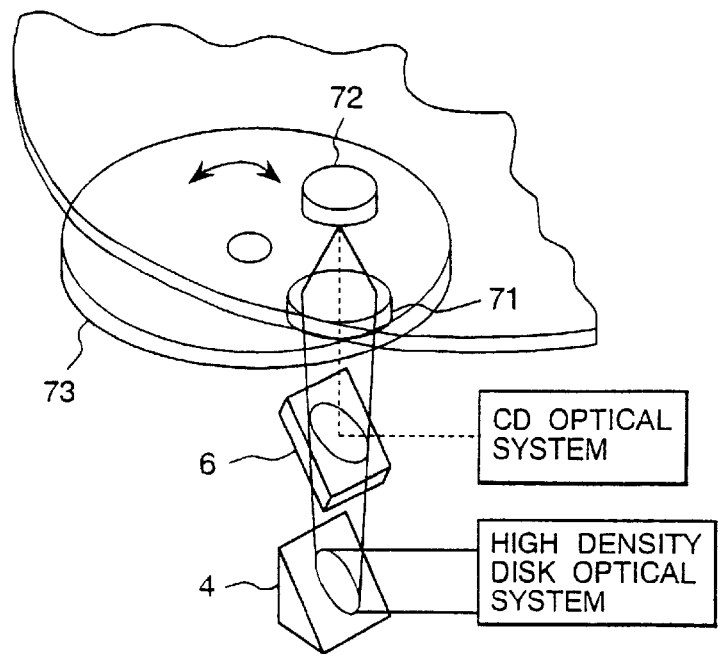

Furthermore, as beam convergent means, a first objective lens 71 for focusing a light flux from the light source 1 on the information recording surface 81 of the high density disk 8 and a second objective lens 72 for focusing a light flux from the laser module 5 on the information recording surface 91 of the normal disk 9 are provided as shown in FIGS. 12a and 12b, and the first objective lens 71 and the second objective lens 72 may be structured so that they are mechanically switched depending on the disk to be recorded or reproduced. FIG. 12a shows a case that a light flux from the CD optical system is irradiated onto the information recording surface 81 of the CD via the second objective lens 72, and FIG. 12b shows a case that a light flux from the high density disk optical system is irradiated onto the information recording surface 91 of the DVD via the first objective lens 71. In either case, the switching is carried out by an actuator (driving means) 73 supporting the two objective lenses 71 and 72 in the movable state.

In this embodiment, the mirror 4 for surface reflection is used as a beam reflect means. However, the present invention is not limited to this example. The beam direction may be changed by inner reflection using a prism.

Figure 5:
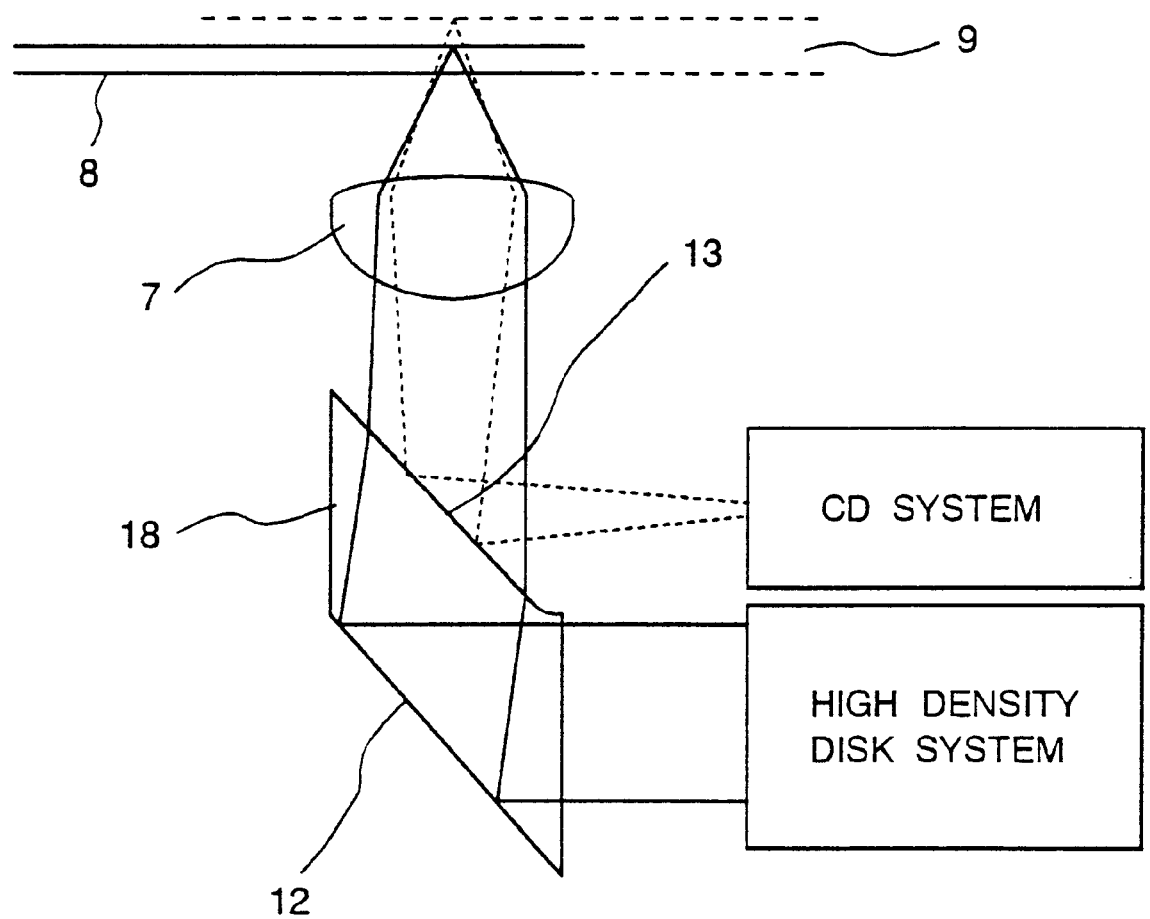
FIG. 5 is a schematic view of a prism comprising a dichroic mirror and a mirror which are integrated.

Furthermore, when a prism 18 is structured so as to have a surface 13 on which a wave length selection film having the same transmittance and reflection factor—wave length dependence as that of a mirror surface 12 totally reflecting the wave length of the light source 1 and the dichroic mirror 6 as shown in FIG. 5 is coated, it is possible to integrate the beam reflect means and the beam synthesize/split means and reduce the number of parts.

The operation of the prism 18 shown in FIG. 5 will be explained hereunder.

A light flux of the high density disk system entering the prism in the perpendicular direction is reflected on the surface 12 and goes toward the surface 13. The light flux transmits the wave length selection film coated on the surface 13 and is led to the objective lens 7. A light flux going toward the objective lens is refracted by the surface 13, so that the surface 12 and the surface 13 are not parallel with each other but designed so that a light flux going toward the objective lens coincides with the optical axis of the objective lens 7. On the other hand, a light flux of the CD optical system reflects on the surface 13 and goes toward the objective lens. The prism 18 has a beam shaping function, and the section of a light flux entering the prism has a different shape from the section of the light flux outputting from the prism, so that care should be taken as to the shape and position of the limited aperture of the high density disk system.

Next, the constitution, operation, and effects of the optical head of the second embodiment of the present invention will be explained with reference to the accompanying drawings.

Figure 6A:
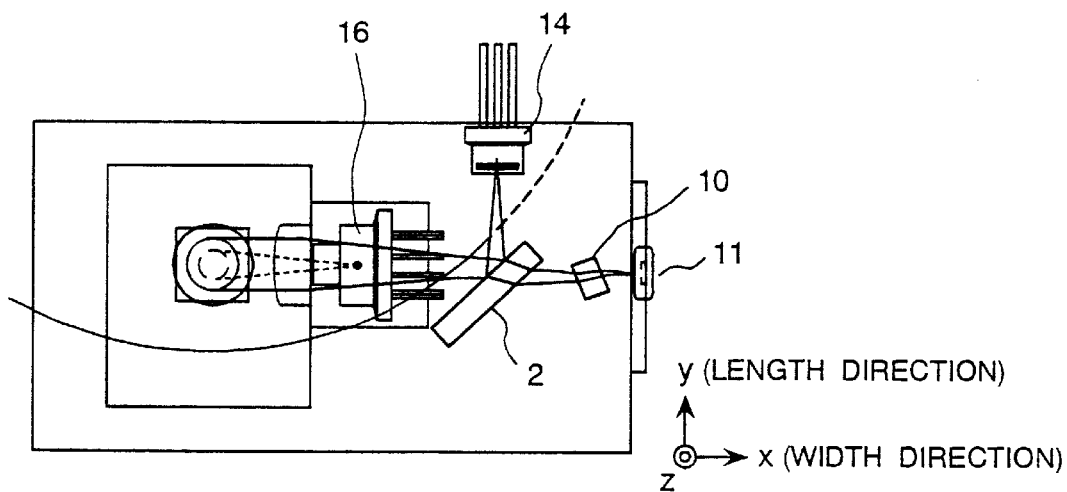
FIG. 6 is a schematic view of an optical head showing the second embodiment of the present invention.
Figure 6B:
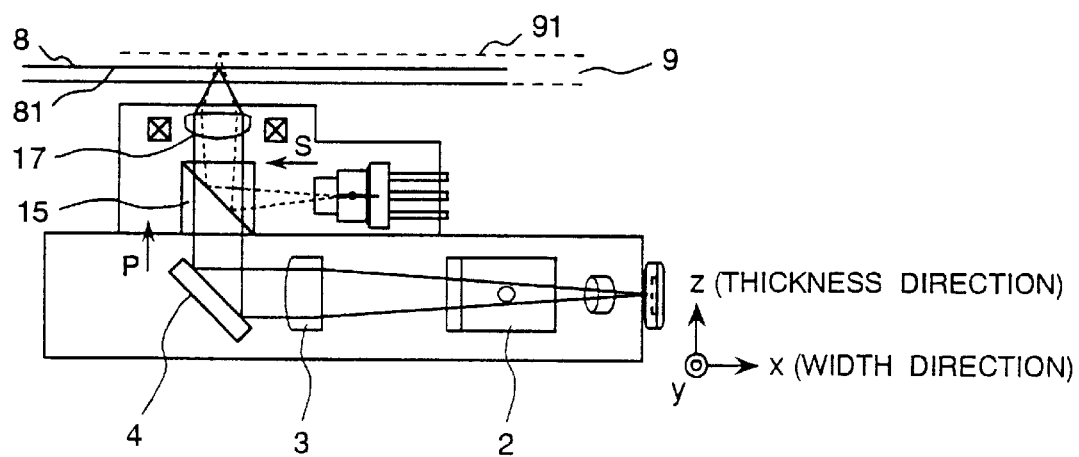

FIGS. 6a and 6b are schematic views of the optical head showing the second embodiment of the present invention. The optical head comprises a half mirror 2, a collimator lens 3, a mirror 4, a high density disk 8, a normal disk 9, a detector optics 10, and a photo detector 11, and the constitution thereof is the same as the constitution of the first embodiment of the present invention.

A light source 14 whose wave length corresponds to the high density disk 8 is mounted in the direction that light enters with the polarization direction being p polarization for a polarized beam splitter 15. For example, a 635-nm semiconductor laser in the TM mode can be used with the far field pattern whose ellipse direction is the same as that of a semiconductor laser oscillating in the ordinary TE mode kept unchanged. The polarized beam splitter 15 has a property for transmitting p polarized light (polarized light whose polarization direction is parallel with the incident plane) with the wave lengths of the light source 14 and a laser module 16, reflecting s polarized light (polarized light whose polarization direction is perpendicular to the incident plane), and converting the beam direction.

The semiconductor laser module 16 whose wave length corresponds to the disk 9 is mounted in the direction that light enters with the polarization direction being p polarization for the polarized beam splitter 15. The semiconductor laser module 16 is also mounted in the position where light enters an objective lens 17 as a suitable divergent light in the same way as with the laser module 5 in the first embodiment. The objective lens 17 is designed so as to focus a parallel light flux with the same wave length as that of the light source 14 on the high density disk 8 with satisfactory aberration.

The operation of an optical head having the aforementioned constitution when the high density disk 8 is recorded or reproduced will be explained hereunder.

The light source 14 is turned on and the laser module 16 is turned off. The light flux among the light fluxes outputted from the light source 14 which is reflected by the half mirror 2 and enters the collimator lens 3 is converted to a parallel light and goes toward the mirror 4. The light flux reflected by the mirror 4 transmits the polarized beam splitter 15 so as to enter with p polarization. The light flux goes straight on as it is, passes through the objective lens 17, and is focused on the information recording surface 81 of the high density disk 8 with satisfactory aberration.

The reflected light from the disk 8 passes through the objective lens 17, transmits the polarized beam splitter 15 with the p polarized light unchanged, and is reflected by the mirror 4. The reflected light is converted to convergent light by the collimator lens 3 and led to the half mirror 2. The light flux transmitting the half mirror 2 passes through the detector optics 10 and is led to the photo detector 11, and a reproduced signal and a control signal are detected.

Next, the operation when the normal disk 9 is recorded or reproduced will be explained hereunder.

The light source 14 is turned off and the laser module 16 is turned on. The light flux outputted from the laser module 16 enters the polarized beam splitter 15 with s polarization and is reflected and led to the objective lens 17. The divergent angle of the light flux entering the objective lens 17 is an angle for canceling the spherical aberration caused by differences in the disk thickness and wave length, so that the light flux is focused on the information recording surface 91 of the disk 9 with satisfactory aberration.

The reflected light from the disk 9 passes through the objective lens 17, enters the polarized beam splitter 15 with the s polarized light unchanged, is reflected by it, and led to the laser module 16, and a reproduced signal and a control signal are detected.

It is desirable to provide an aperture limit in the non-common portions of the high density disk optical system and the CD optical system respectively or to provide an aperture limit using a wave length selection filter having the same transmittance and reflection factor—wave length dependence as that of the dichroic mirror 6 between the objective lens 17 and the polarized beam splitter 15, or to provide an aperture limit using a polaroid filter for transmitting polarized light of the high density disk system and reflecting polarized light of the CD system.

As mentioned above, also according to the second embodiment of the present invention, two or more kinds of disks with different corresponding wave lengths as before can be recorded or reproduced.

Next, effects of the second embodiment of the present invention will be explained by comparing with the constitution of a conventional optical head. The coordinate system is as shown in each drawing.

Figure 7A:
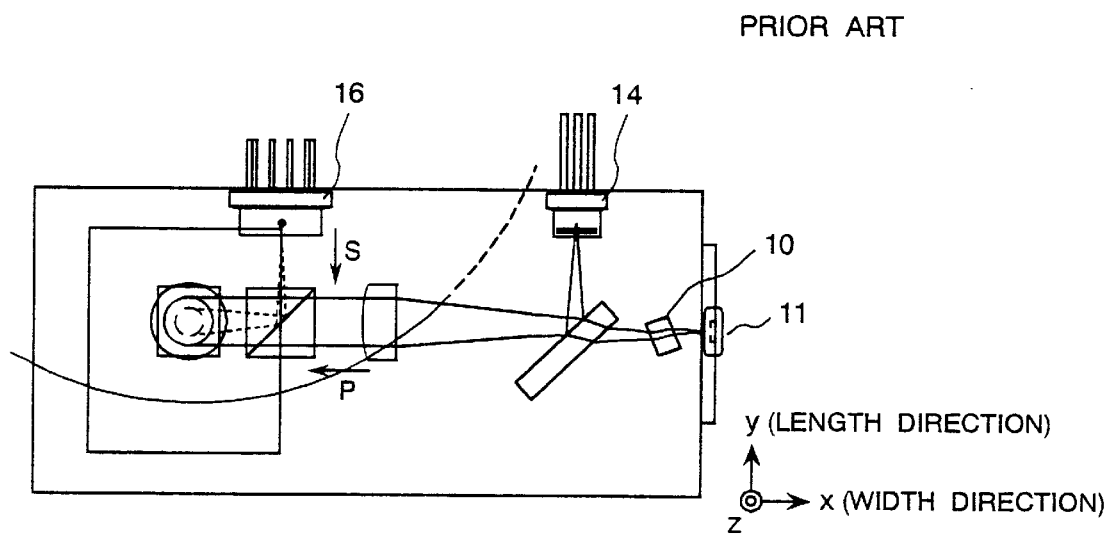
FIG. 7 is a schematic view of a conventional optical head.
Figure 7B:
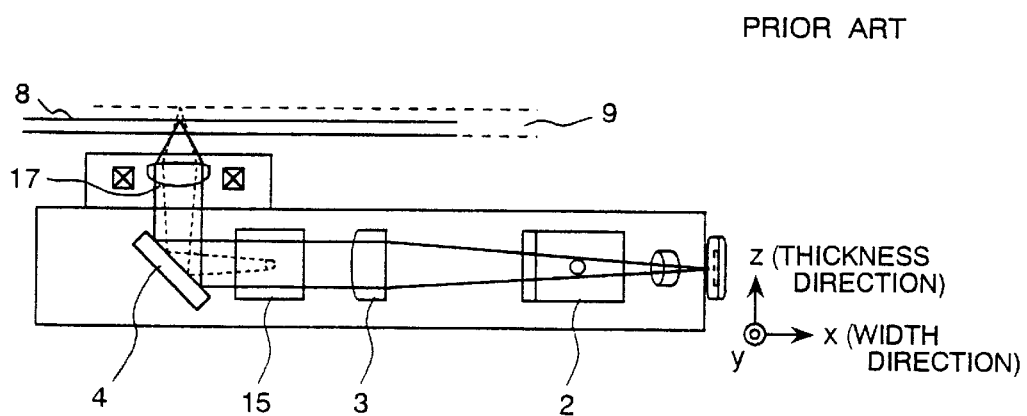

FIGS. 7a and 7b show an optical head having the mirror 4 arranged between a beam synthesize/split means (the polarized beam splitter 15 in the drawing) and a beam convergent means (the objective lens 17 in the drawing) as shown in FIG. 10a as prior art. The light source 14 is arranged in the direction in which a light flux entering the polarized beam splitter 15 becomes p polarized light and the laser module 16 is also arranged in the direction in which a light flux entering the polarized beam splitter 15 becomes s polarized light.

Figure 8A:
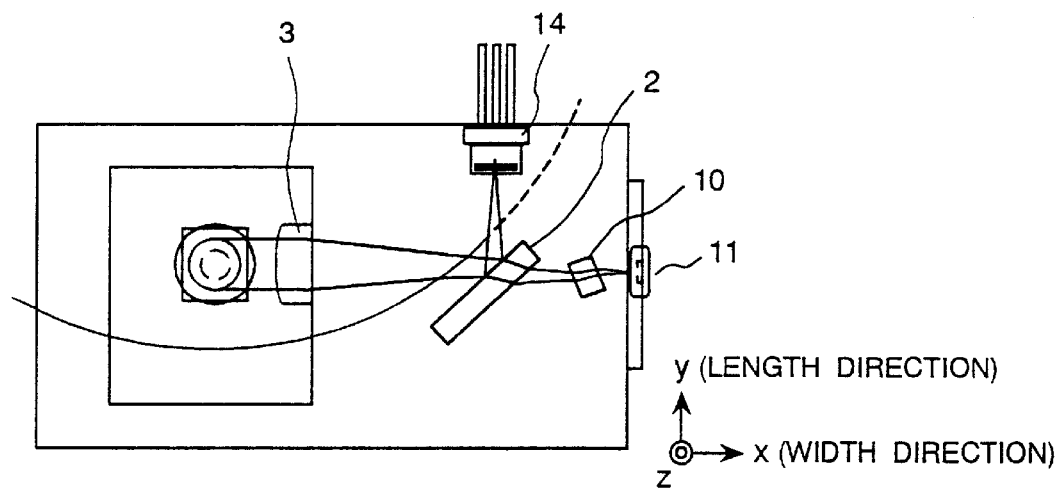
FIG. 8 is a schematic view of a conventional optical head.
Figure 8B:
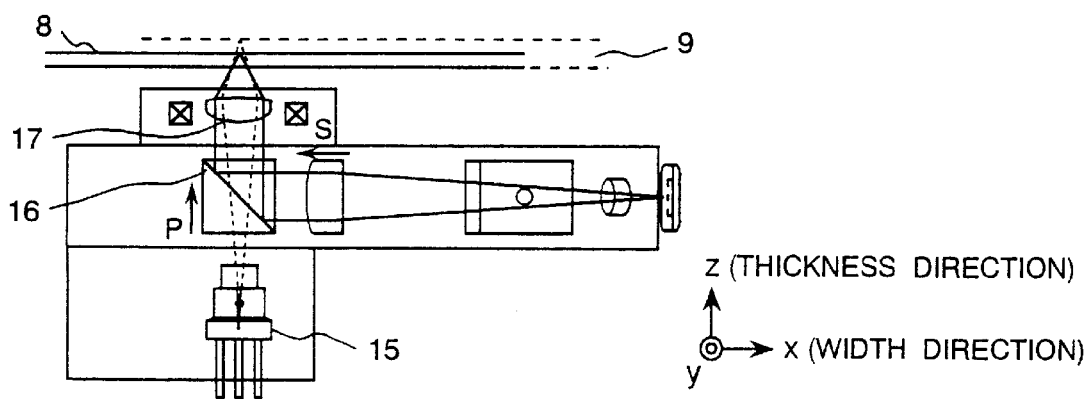

FIGS. 8a and 8b show an optical head having no beam reflect means (the mirror 4 in the drawing) which is structured so as to lead a light flux synthesized by a beam synthesize/split means (the polarized beam splitter 15 in the drawing) directly to a beam convergent means (the objective lens 17 in the drawing) as shown in FIG. 10b as prior art. The light source 14 is arranged in the direction in which a light flux entering the polarized beam splitter 15 becomes s polarized light and the laser module 16 is arranged in the direction in which a light flux entering the polarized beam splitter 15 becomes p polarized light.

The optical head in the second embodiment of the present invention shown in FIGS. 6a and 6b is smaller in the length in the x direction than the conventional head shown in FIGS. 7a and 7b by the length of the polarized beam splitter in the x direction. In this way, an optical head which is smaller than a conventional one in the x direction (width direction) can be provided and can be mounted in an optical disk unit which is restricted in the x direction.

In the case of the optical head shown in FIGS. 7a and 7b the distance between the objective lens 17 and the laser module 16 cannot be reduced to a certain distance or less due to the mirror 4 existing in the optical path, and accordingly it may be impossible to arrange the laser module 16 in a desired position. However, the optical head in the embodiment shown in FIGS. 6a and 6b is free of this problem.

As compared with FIG. 8, the length of the optical head in the x direction in the second embodiment of the present invention is equal to that shown in FIGS. 8a and 8b, and the length in the z direction is equal to or smaller than that shown in FIGS. 8a and 8b. The length in the z direction is equal to that shown in FIGS. 8a and 8b at most depending on the position decided from the package shape of the laser module 16 and the divergent angle entering the objective lens 17. However, the optical head of the present invention has an advantage that it does not depend on these conditions and is generally smaller in the z direction.

As mentioned above, also according to one embodiment, when the beam synthesize/split means is installed between the mirror 4 of the high density disk optical system and the objective lens 7, the dimensions of an optical head in the thickness, width, and length directions which records or reproduces two or more kinds of disks with different corresponding wave lengths are made moderate and the optical head can be mounted in an optical disk unit to be built in a personal computer or an audio one for a car, the size of which optical disk unit is restricted. Furthermore, when the CD optical system is set as a finite system and a laser module with light emission and reception integrated is used, the number of parts is reduced and a small and inexpensive optical head can be provided.

In this embodiment, the polarized beam splitter 1S transmits p polarized light both with the wave length of the light source 14 and the wave length of the laser module 16. However, the present invention is not limited to this example. For example, a polarized beam splitter having a wave length dependence such that it transmits both p polarized light and s polarized light for the wave length of the light source 14, and transmits p polarized light and reflects s polarized light for the wave length of the laser module 15 may be used. In this case, even if the light source 14 is assumed as a laser with a wave length of nm in the TE mode, it can be used with the far field pattern whose ellipse direction is the same kept unchanged.

In this embodiment, the position of the laser module 16 is specified by the divergent angle entering the objective lens 17. However, the present invention is not limited to it. When a means for converting the divergent and convergent angles of a light flux of a concave lens or others is installed between the laser module 16 and the polarized beam splitter 15, and the divergent angle of an incident light flux into the objective lens 17 is controlled by the lens power, the position of the laser module 16 can be decided optionally.

In this embodiment, an objective lens designed so as to focus a parallel light flux with the wave length of the light source 14 on the information recording surface of the high density disk 8 with satisfactory aberration is used as a beam convergent means. However, the present invention is not limited to this example. The same effect can be obtained also by using an objective lens designed so as to focus the predetermined divergent light flux or convergent light flux with the wave length of the light source 14 on the information recording surface of the high density disk 8 with satisfactory aberration when the high density disk optical system is set as a finite system. A hologram objective lens may be used as a beam convergent means. The hologram pattern is that the primary light is focused on the information recording surface of the disk 9 with satisfactory aberration for the wave length of the laser module 16, and the zero-order light is focused on the information recording surface of the high density disk 8 with satisfactory aberration for the wave length of the light source 14. Even if the hologram is directly engraved on the lens, it may move together with the objective lens as a different part.

Or, as beam convergent means, a first objective lens for focusing a light flux from the light source 14 on the information recording surface of the high density disk 8, and a second objective lens for focusing a light flux from the laser module 16 on the information recording surface of the normal disk, are provided, and the first objective lens and the second objective lens may be structured so that they are mechanically switched depending on the disk to be recorded or reproduced.

In this embodiment, the mirror 4 for surface reflection is used as a beam reflect means. However, the present invention is not limited to this example. The beam direction may be changed by inner reflection using a prism.

Figure 9:
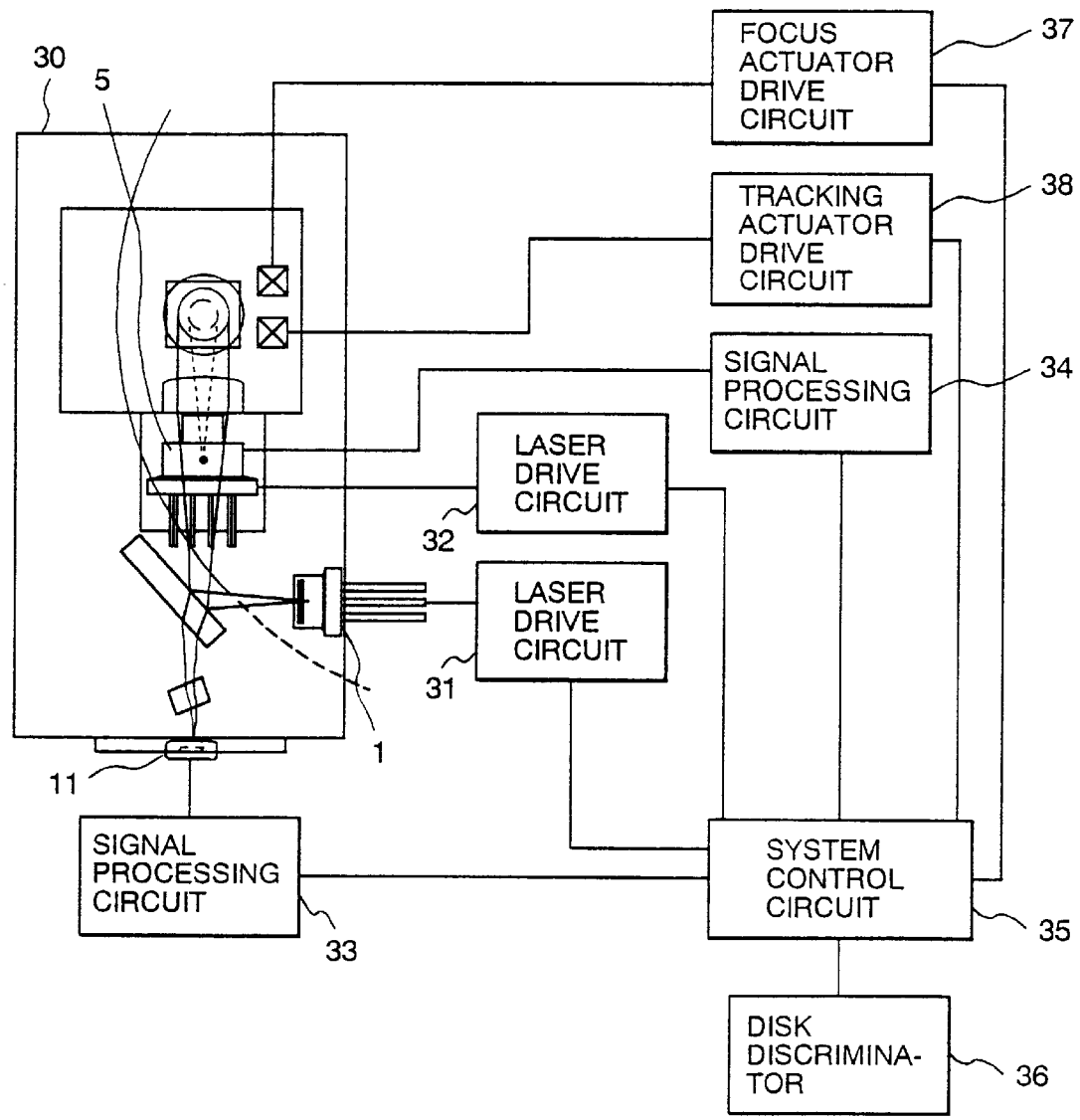
FIG. 9 is a block diagram of an optical disk unit showing the third embodiment of the present invention.

Next, the third embodiment of the present invention will be explained by referring to FIG. 9. FIG. 9 is a block diagram of the optical disk unit showing the third embodiment of the present invention.

The optical head 30 may be the optical head shown in the first embodiment described above. However, the optical head shown in the second embodiment may be used. The light source 1 and the laser module 5 of the optical head 30 turn light emission on or off and control output power respectively by a laser drive circuit 31 and a laser drive circuit 32. The outputs of the photo detector 11 and the laser module 5 are supplied to signal processing circuits 33 and 34 respectively and various signals such as a focus error signal, a tracking error signal, and a main signal are generated. These signals are supplied to a system control circuit 35.

A disk discriminator 36 discriminates the kind of a disk mounted in an optical disk unit and outputs the result to the system control circuit 35. The system control circuit 35 turns the light source 1 on when the mounted disk is the high density disk 8 and turns the laser module 5 on when the mounted disk is the present disk 9 on the basis of the result from the disk discriminator 36. Furthermore, the system control circuit 35 supplies the focus error signal to a focus actuator drive circuit 37 and the tracking error signal to a tracking actuator drive circuit 38 on the basis of a signal generated by the corresponding signal processing circuit 33 or 34. By doing this, the focus and tracking servo operations are performed and recording or reproducing of the disk 8 or 9 is executed.

According to the present invention, a small disk unit which is provided with an optical head of the present invention which is small in the length direction x and the width direction y so as to avoid interference with other mechanisms such as the loading mechanism, and which can record or reproduce two or more kinds of disks with different corresponding wave lengths, can be realized.

According to the present invention, with respect to an optical disk unit for recording and/or reproducing two or more kinds of disks with different corresponding wave lengths, an optical head whose dimensions in the width, length, and thickness directions are made moderately smaller can be provided, and also a small optical disk unit can be provided.

What is claimed is:

1. An optical head comprising:
   a first disk having an information recording surface having a predetermined corresponding wave length;
   a second disk having an information recording surface having a corresponding wave length which is different from that of said first disk;
   beam convergent means for transmitting first and second light fluxes with different wave lengths which are reflected from information recording surfaces of said first and second disks;
   light separation means for separating a light flux from said beam convergent means into a first and a second light flux;
   beam reflect means for changing the beam direction of said first light flux from said light separation means, said light separation means being disposed between said beam convergent means and said beam reflect means;
   first light detection means for detecting a light flux from said beam reflect means; and
   second light detection means for detecting said second light flux.

2. An optical head comprising:
   a first disk having an information recording surface having a predetermined corresponding wave length;
   a second disk having an information recording surface having a corresponding wave length which is different from that of said first disk;
   first light emission means for generating light having the predetermined wave length;
   second light emission means for generating light having a different wave length from that of said first light emission means;
   beam convergent means for converging a first light flux outputted from said first light emission means on the information recording surface of said first disk and also converging a second light flux outputted from said second light emission means on the information recording surface of said second disk having a different corresponding wave length from that of said first disk and furthermore transmitting first and second light fluxes with different wave lengths which are reflected from said first and second information recording surfaces;
   beam reflect means which is arranged between said first light emission means and said beam convergent means and changes the beam directions of a light flux from said first light emission means and a light flux from said beam convergent means;
   beam synthesize/split means which is arranged between said beam reflect means and said beam convergent means and synthesizes said first light flux and said second light flux and outputs them to said light flux converging means or separates a light flux from said light flux converging means into a first or second light flux;

first light detection means for detecting a light flux from said beam reflect means; and second light detection means for detecting said second light flux.

3. An optical head according to claim 2, wherein the optical axis of said light flux converging means is almost perpendicular to said information recording surfaces of said first and second disks, and the optical axis of said first light emission means intersects the optical axis of said light flux converging means almost orthogonally, and said first light emission means and said second light emission means are arranged so that the optical axis of said first light emission means and the optical axis of said second light emission means are parallel with each other.

4. An optical head according to claim 2, wherein said beam convergent means comprises a hologram objective lens.

5. An optical head according to claim 2, wherein said beam convergent means comprises an objective lens and a hologram.

6. An optical head according to claim 2, wherein light flux conversion means for converting the divergent angle or convergent angle of said second light flux is provided between said beam convergent means and said second light emission means.

7. An optical disk unit comprising:

first light emission means;

second light emission means having a different wave length from that of said first light emission means;

beam convergent means for converging a first light flux outputted from said first light emission means on the information recording surface of a first disk and converging a second light flux outputted from said second light emission means on the information recording surface of a second disk which is different from said first disk in the corresponding wave length;

disk discriminator for discriminating the kind of a mounted disk; and control means for switching the operation statuses of said first light emission means and said second light emission means on the basis of the decision result of said disk discriminator;

wherein said optical disk unit is an optical disk unit which can record and/or reproduce said first or second disk and said optical head has beam reflect means which is arranged between said first light emission means and said beam convergent means and changes the beam direction of said first light flux and also has beam synthesize/split means for synthesizing said first light flux and said second light flux between said beam reflect means and said beam convergent means.

8. An optical head comprising:

a first disk having an information recording surface having a predetermined corresponding wave length;

a second disk having an information recording surface having a corresponding wave length which is shorter than that of said first disk;

first light emission means for generating light having the predetermined wave length;

second light emission means for generating light having a wave length longer than that of said first light emission means;

beam convergent means for converging a first light flux outputted from said first light emission means on the information recording surface of said first disk and also converging a second light flux outputted from said second light emission means on the information recording surface of said second disk having a corresponding wave length shorter than that of said first disk and furthermore converging first and second light fluxes with different wave lengths which are reflected from said first and second information recording surfaces;

beam reflect means which is arranged between said first light emission means and said beam convergent means and changes the beam directions from said first light emission means and a light flux from said beam convergent means;

beam synthesize/split means which is arranged between said beam reflect means and said beam convergent means and synthesizes said first light flux and said second light flux and outputs them to said light flux converging means or separates a light flux from said light flux converging means into a first or second light flux;

first light detection means for detecting a light flux from said beam reflect means; and second light detection means for detecting said second light flux.

9. An optical head comprising:

a first light source of light having a first wave length;

a second light source of light having a second wave length that is different from that of said first light source;

an objective lens device arranged to receive and converge a first light beam outputted from said first light source onto the information recording surface of a first disk, and to receive and converge a second light beam outputted from said second light source onto the information recording surface of a second disk which is different from said first disk in the corresponding wave length;

a reflector arranged in an optical path from said first light source to said objective lens device, so as to change the beam direction of said first light beam; and a beam synthesizer arranged in an optical path from said reflector to said objective lens device, so as to synthesize said first light beam and said second light beam;

wherein said first and second light sources are arranged so that the optical axis of said first light source and the optical axis of said second light source are parallel with each other.

10. An optical head according to claim 9, wherein said objective lens device comprises a first objective lens for converging said first light beam onto said information recording surface of said first disk, and a second objective lens for converging said second light beam onto said information recording surface of said second disk.

11. An optical head according to claim 9, wherein said beam synthesizer comprises an element having a property such that said element transmits said first light beam and reflects said second light beam.

12. An optical head according to claim 9, wherein said beam synthesizer comprises a polarization element having a property such that said polarization element transmits a light beam with the wave length of said first light source whose polarization direction is parallel to a light inlet surface thereto, and reflects a light beam with the wave length of said second light source whose polarization direction is perpendicular to the light inlet surface.

13. An optical head according to claim 9, wherein said reflector is a prism of inner reflection.

14. An optical head according to claim 9, wherein the functions fulfilled by said reflector and said beam synthesizer are performed by a single prism.

15. An optical head according to claim 9, wherein said second light beam entering said objective lens device is a divergent light.

16. An optical head according to claim 9, wherein said first light source is a short wave length laser source for a high density storage disk, and said second light source is a laser source for a CD having a wave length longer than that of said first light source.

17. An optical head comprising:

a first light source of light having a first wave length;

a second light source of light having a second wave length that is different from that of said first light source;

an objective lens device arranged to receive and transmit first and second light beams respectively reflected from the information recording surfaces of a first disk having an information recording surface corresponding to the first wave length and a second disk having an information recording surface corresponding to the second wave length, said first and second light beams having different respective wave lengths;

a beam splitter arranged to receive the converged first and second light beams from said objective lens device and to separate the received light beams into said first and second light beams;

a reflector arranged to receive said first light beam from said beam splitter and to change the direction of propagation of said first light beam, said beam splitter being disposed in an optical path from said objective lens device to said reflector;

a first light detector arranged to receive the first light beam from said reflector; and a second light detector arranged to receive said second light beam from said beam splitter;

wherein said first and second light sources are arranged so that the optical axis of said first light source and the optical axis of said second light source are parallel with each other.

18. An optical head comprising:

a first light source of light having a first wave length;

a second light source of light having a second wave length which is different from the first wave length;

an objective lens device arranged to receive and converge a first light beam outputted from said first light source onto the information recording surface of a first disk having a corresponding first wave length, and to receive and converge a second light beam outputted from said second light source onto the information recording surface of a second disk having a corresponding second wave length which is different from said first wave length, and furthermore to receive and transmit respective corresponding first and second light beams having different respective wave lengths which are reflected from said first and second information recording surfaces;

a reflector arranged in an optical path from said first light source to said objective lens device, so as to change the beam directions of the first light beam received from said first light source and a light beam received from said objective lens device;

a beam synthesizer/splitter arranged in an optical path from said reflector to said objective lens device, so as to synthesize said first light beam and said second light beam coming from said first and second light sources, respectively, and to output them to said objective lens device, and to receive and separate a light beam transmitted from said objective lens device into said first and second light beams;

a first light detector arranged to receive said first light beam from said reflector; and a second light detector arranged to receive said second light beam from said beam synthesizer/splitter;

wherein said first and second light sources are arranged so that the optical axis of said first light source and the optical axis of said second light source are parallel with each other.

19. An optical head according to claim 18, wherein said objective lens device comprises a hologram objective lens.

20. An optical head according to claim 18, wherein said objective lens device comprises an objective lens and a hologram.

21. An optical head according to claim 18, further comprising an angle converter provided in an optical path from said objective lens device to said second light source, arranged so as to convert the divergent angle or convergent angle of said second light beam.

22. An optical disk unit comprising:

a first light source of light having a first wave length;

a second light source of light having a second wave length that is different from that of said first light source;

an objective lens device arranged to converge a first light beam outputted from said first light source onto the information recording surface of a first disk and a second light beam outputted from said second light source onto the information recording surface of a second disk;

a disk discriminator arranged to discriminate the kind of a mounted disk; and a controller arranged to switch the operation statuses of said first light source and said second light source on the basis of the decision result of said disk discriminator;

wherein said optical disk unit has a reflector arranged in an optical path from said first light source to said objective lens device so as to change the beam direction of said first light beam, and a beam synthesizer/splitter arranged to receive and synthesize said first light beam and said second light beam, said beam synthesizer/splitter being positioned in an optical path from said reflector to said objective lens device; and wherein the first and second light sources are arranged so that the optical axis of said first light source and the optical axis of said second light source are parallel with each other.

23. An optical disk device for reproducing data from a first disk read out by a light beam of a first wave length and a second disk read out by a light beam of a second wave length, said first wave length being longer than said second wave length, comprising:

a first light source of light having the first wave length;

a second light source of light having the second wave length;

an objective lens device arranged to receive and converge a first light beam outputted from said first light source onto the information recording surface of said first disk and to receive and converge a second light beam outputted from said second light source onto the information recording surface of said second disk;

a first optical surface arranged in an optical path from said first light source to said objective lens device, so as to change the beam direction of said first light beam; and a second optical surface arranged in an optical path from said first optical surface to said objective lens device, so as to reflect said second light beam and to transmit said first light beam;

wherein said first and second light sources are arranged so that the optical axis of said first light source and the optical axis of said second light source are parallel with each other.

* * * * *